(12) United States Patent
Gretz (10) Patent No.: US 7,151,219 B1
(45) Date of Patent: Dec. 19, 2006

(54) RECESSED OUTLET BOX

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/102,392

(22) Filed: Apr. 8, 2005

Related U.S. Application Data (63) Continuation-in-part of application No. 11/070,344, filed on Mar. 2, 2005, now Pat. No. 6,965,078, which is a continuation-in-part of application No. 11/009,116, filed on Dec. 10, 2004, now Pat. No. 7,005,578, which is a continuation-in-part of application No. 10/863,942, filed on Jun. 9, 2004, now Pat. No. 6,956,171.

(51) Int. Cl.
*H01H 9/02* (2006.01)

(52) U.S. Cl. .................. 174/58; 174/60; 248/906; 439/535; 220/4.02

(58) Field of Classification Search .................. 174/58, 174/60, 135, 50; 220/4.02, 3.8, 3.6; 439/353, 439/535; 248/906
See application file for complete search history.

(56) References Cited

U.S. PATENT DOCUMENTS

| 4,424,407 A | 1/1984 | Barbic |
| 4,593,541 A | 6/1986 | Hollis |
| 4,803,307 A | 2/1989 | Shotey |
| 4,988,832 A | 1/1991 | Shotey |
| 5,117,996 A * | 6/1992 | McShane .................. 220/3.7 |
| 6,737,576 B1 * | 5/2004 | Dinh .......................... 174/50 |

FOREIGN PATENT DOCUMENTS

| CA | 644330 | 7/1962 |

* cited by examiner

*Primary Examiner*—Dhiru R. Patel (57) ABSTRACT

A two-piece electrical box for recessing a duplex receptacle or similar electrical device within a wall. An inner box including a flange is recessed into a hole in a wall until the flange is flush with the wall. The inner box is then secured to the wall. An outer box is then secured to the inner box. A cover on the outer box provides a rainproof enclosure for the plug ends of electrical cords while they are connected to the electrical device housed therein.

16 Claims, 11 Drawing Sheets

RECESSED OUTLET BOX

This application is a Continuation-In-Part of U.S. patent application Ser. No. 11/070,344, filed Mar. 2, 2005 now U.S. Pat. No. 6,965,078, which is a Continuation-In-Part of U.S. patent application Ser. No. 11/009,116 filed Dec. 10, 2004 now U.S. Pat. No. 7,005,578, which is a Continuation-In-Part of U.S. patent application Ser. No. 10/863,942 filed Jun. 9, 2004 now U.S. Pat. No. 6,956,171.

FIELD OF THE INVENTION

This invention relates to electrical junction boxes and specifically to a two-piece recessed outlet box that can be easily secured to the exterior of a building for accommodating and protecting a duplex outlet or other electrical device therein.

BACKGROUND OF THE INVENTION

Recessed electrical boxes for retrofitting on finished walls or for use in new construction were disclosed in co-pending U.S. application Ser. Nos. 10/863,942, 11/009,116, and 11/070,344, commonly owned by the assignee of the present invention, the contents of which are incorporated herein by reference. The recessed electrical box disclosed in the co-pending applications comprised an electrical box having an inner enclosure for housing an electrical device and an outer enclosure for recessing the inner enclosure well within a wall. One or more flanges extended outwardly from the electrical box. For mounting to new construction, a first, breakaway inner flange was left intact and utilized as is for securing the box to the newly constructed building's substrate. Conversely, if mounted to an existing building in a retrofit situation, the inner flange was broken away to allow insertion of the box within an appropriately sized hole created for the box in the existing building. An outer flange was provided for masking the siding or other wall covering at the juncture of the electrical box with the surrounding siding. A cover member having a narrow peripheral side wall was provided for closing and rainproofing the electrical device therein. The co-pending applications disclosed the outer enclosure of the electrical box being a larger size than the inner enclosure to facilitate easy access to the inner enclosure and easy shedding of any residual rainfall that penetrated therein.

The present invention provides a two-piece electrical box for recessing an electrical device within a wall. The two-piece electrical box includes an inner box that is mounted to the substrate of a newly constructed building. The outer wall covering, such as siding or stucco, is then installed around the inner box. An electrical device is then installed within the inner box. After the outer wall covering is completed, the outer box portion is secured to the inner box portion, thereby providing a rainproof enclosure for the electrical device installed therein and obscuring the irregular edges of the wall covering surrounding the inner box portion.

Accordingly, the present invention improves upon the rainproof recessed outlet box of the co-pending-applications-by-providing a-two-piece-electrical-box that allows easy finishing of the outer wall covering. The inner box portion recesses the electrical device well within the surrounding wall, thereby protecting it from accidental impacts. The outer box portion includes a cover member for protecting electrical cords while they are in use and plugged into the receptacle within the inner box.

SUMMARY OF THE INVENTION

The invention is a two-piece electrical box for recessing a duplex receptacle or similar electrical device within a wall. An inner box portion includes side walls, an inner flange extending outward transversely from the side walls, and a peripheral wall extending forward from the flange. The inner box is capable of recessing into a hole in a wall until the inner flange is flush with the wall. An outer box includes a front peripheral wall, a front opening, and a rear opening. A cover on the outer box can be closed to provide a rainproof enclosure therein for the plug ends of electrical cords while they are connected to the electrical device. A fastening arrangement is provided for securing the outer box to the inner box and the wall.

OBJECTS AND ADVANTAGES

The recessed electrical box of the present invention simplifies the installation of electrical devices on all types of finished exteriors, including siding or stucco. The siding can be flat or lapped and be constructed of vinyl, aluminum, or wood.

A further advantage is that the recessed electrical box provides a first enclosure that positions the electrical device within the exterior wall, thereby shielding the electrical device from impacts, and a second enclosure for shielding the electrical device and any electrical cords plugged therein from rain and other environmental elements.

The current recessed electrical box further provides, when used to house a duplex outlet, an electrical box and a spacious protective enclosure for protecting the plug ends of electrical cords.

The electrical box furthermore includes integral bosses with threaded bores for accepting fasteners from an electrical device.

The electrical box of the present invention also includes a pivotable cover for closing the protective enclosure, which provides the advantage of being able to move the cover between an open and closed position These and other objects and advantages of the present invention will be better understood by reading the following description along with reference to the drawings.

TABLE OF NOMENCLATURE

| Part Number | Description |
| --- | --- |
| 20 | two-piece recessed electrical box |
| 22 | inner box or first piece of electrical box |
| 23 | second piece of electrical box |
| 24 | outer box |
| 25 | cover |
| 26 | side walls of inner box |
| 27 | back wall |
| 28 | inner flange |
| 30 | forward extending peripheral wall |
| 31 | planar front edge of inner box |
| 32 | boss |
| 34 | aperture in boss |
| 36 | removable wall section |
| 38 | ear on inner flange |
| 40 | opening in ear |
| 41 | aperture in inner flange |
| 42 | front peripheral wall of outer box |
| 43 | outer flange |
| 44 | front opening of outer box |
| 46 | rear opening of outer box |
| 48 | front edge of outer box |
| 50 | bottom portion |
| 51 | aperture in outer flange |
| 52 | post |
| 54 | upper end of front peripheral wall |
| 56 | U-shaped slot in front peripheral wall |
| 58 | opening |
| 60 | latch member |
| 62 | downward depending portion |
| 64 | lip |
| 66 | indentation |
| 68 | front wall of cover |
| 70 | stiffening peripheral wall |
| 72 | upper wall |
| 74 | lower wall |
| 76 | side wall |
| 78 | ear on cover member |
| 80 | aperture in ear of cover member |
| 82 | tab |
| 84 | opening in cover |
| 86 | upper edge |
| 88 | U-shaped slot in cover |
| 90 | integral spacer |
| 92 | substrate |
| 94 | hole in substrate |
| 96 | fastener |
| 98 | siding |
| 100 | duplex outlet |
| 102 | device fastener |
| 104 | face plate |
| 106 | fastening arrangement |
| 108 | fastener |
| 110 | first enclosure |
| 112 | second enclosure |
| 114 | electrical cord |
| 115 | plug end |
| 116 | inner surface of side walls of inner box |
| 118 | inner surface of front peripheral wall of outer box |
| 120 | gap between cover and front edge |
| 122 | caulking |
| 124 | interface between inner box and outer box |
| 126 | circular cord opening |

DETAILED DESCRIPTION OF THE INVENTION

Figure 7:
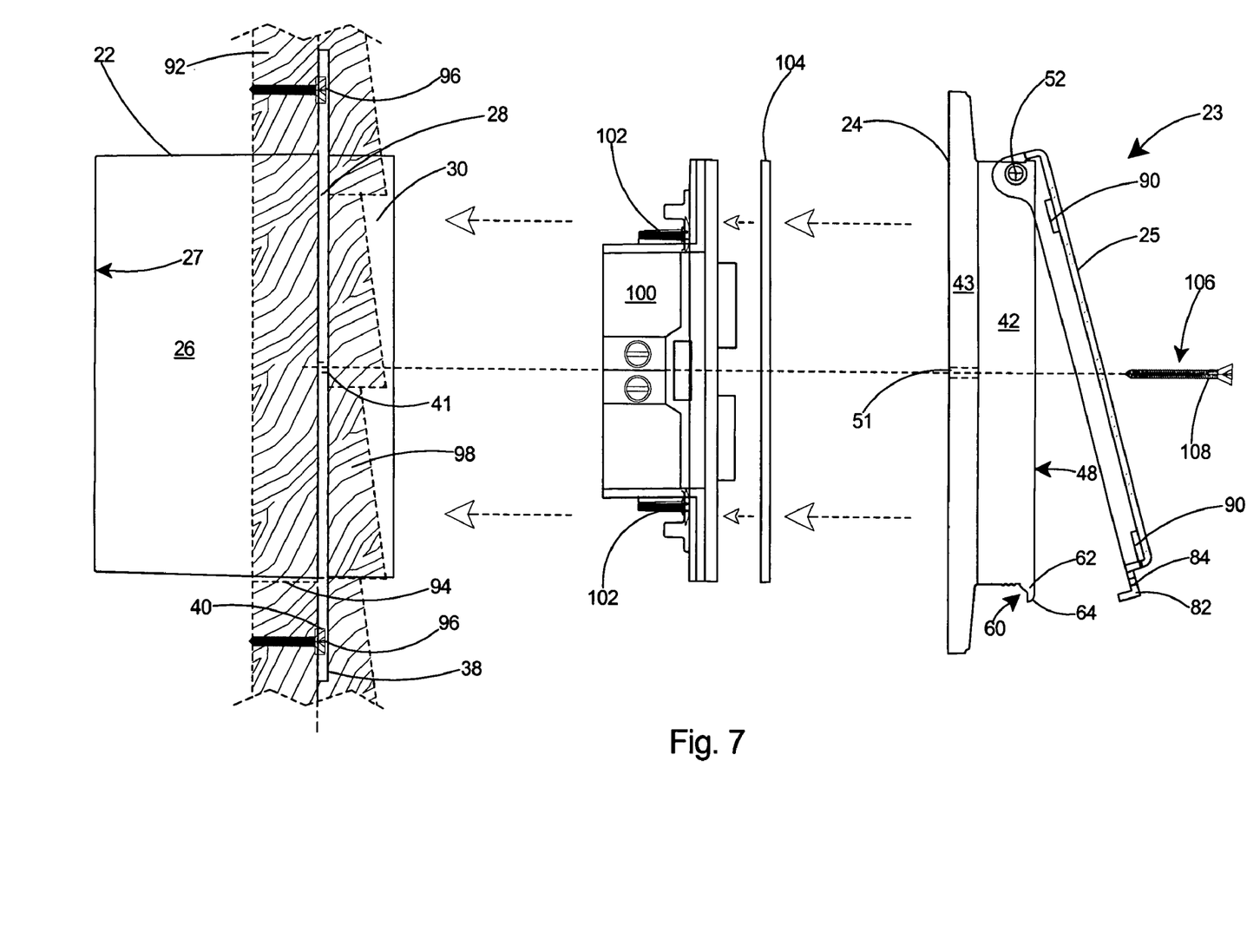
FIG. 7 is an exploded side view of the inner box portion secured to a wall and with a duplex receptacle and the outer box portion in alignment and ready to be joined thereto.

The present invention comprises a two-piece electrical box for securing an electrical device on the exterior wall of a building. As shown in FIG. 7, the two-piece electrical box 20 has a first piece or inner box 22 and a second piece 23 that includes an outer box 24 with a cover 25 pivotally attached thereto.

Figure 1:
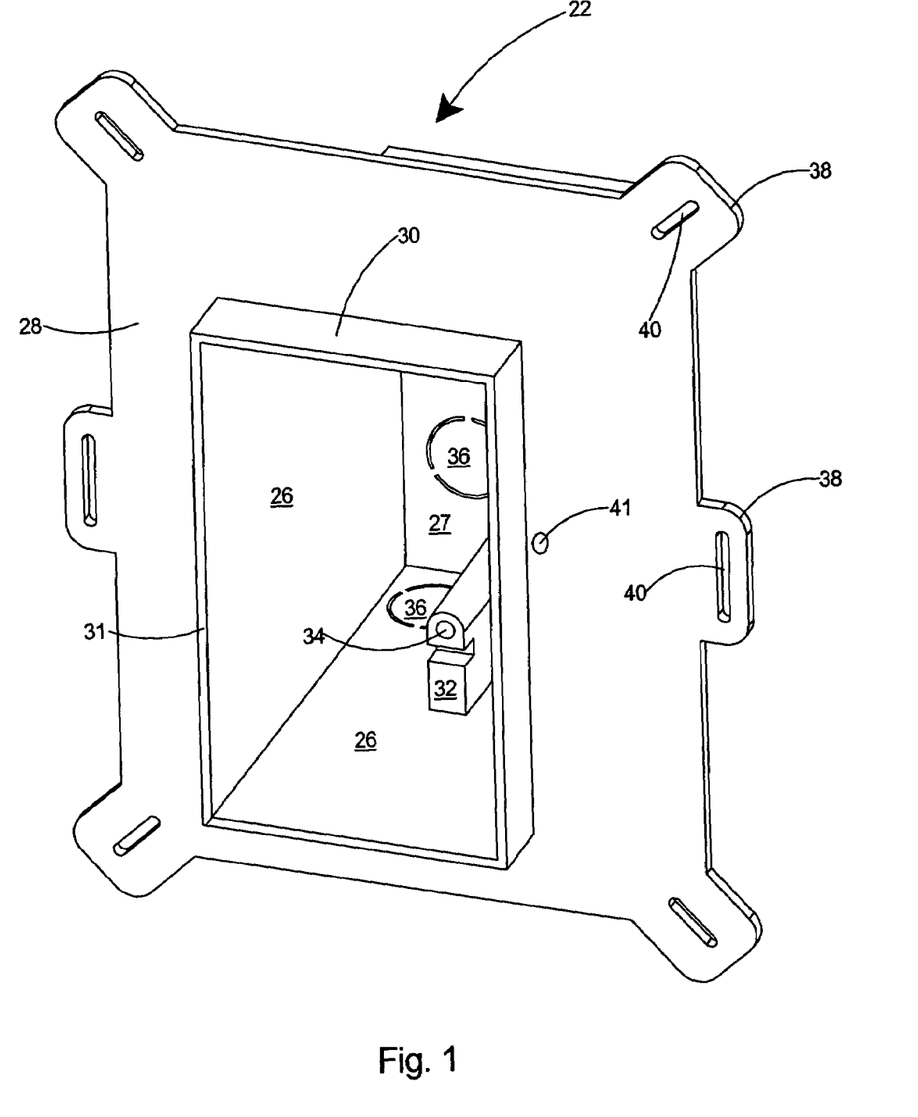
FIG. 1 is a perspective view of a preferred embodiment of an inner box portion of an electrical box according to the present invention.
Figure 3:
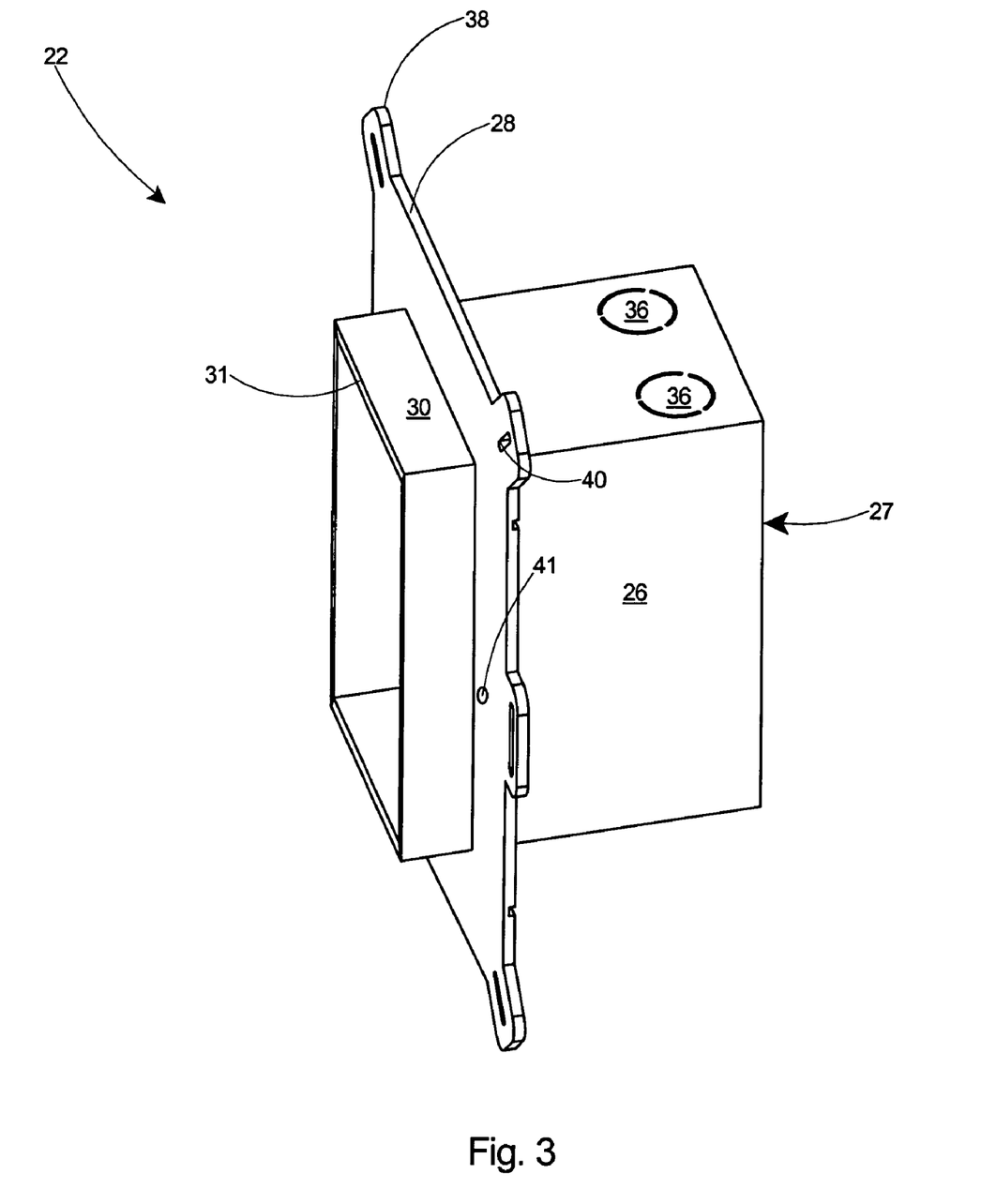
FIG. 3 is perspective view of the inner box portion of FIG. 1.
Figure 5:
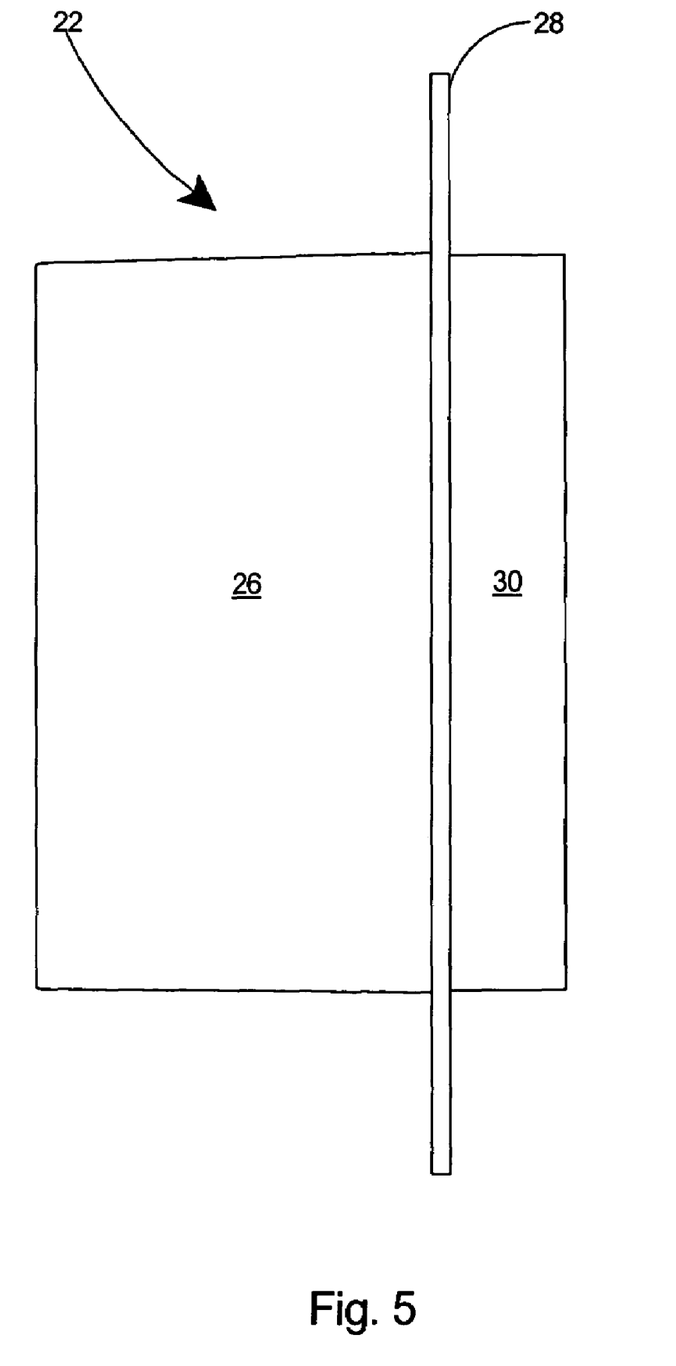
FIG. 5 is a side view of a inner box portion of FIG. 1.

With reference to FIG. 1, the inner box 22 includes side walls 26, a back wall 27, an inner flange 28 extending outward transversely from the side walls 26, and a forward extending peripheral wall 30 having a planar front edge 31. The side walls 26 of the inner box 22 include bosses 32 containing apertures 34 therein and removable wall sections 36. The inner flange 28 includes ears 38 having openings 40 therein and one or more apertures 41 adjacent the forward extending peripheral wall 30. As shown in FIGS. 3 and 5, the forward extending peripheral wall 30 extends substantially forward of the inner flange 28.

Figure 2:
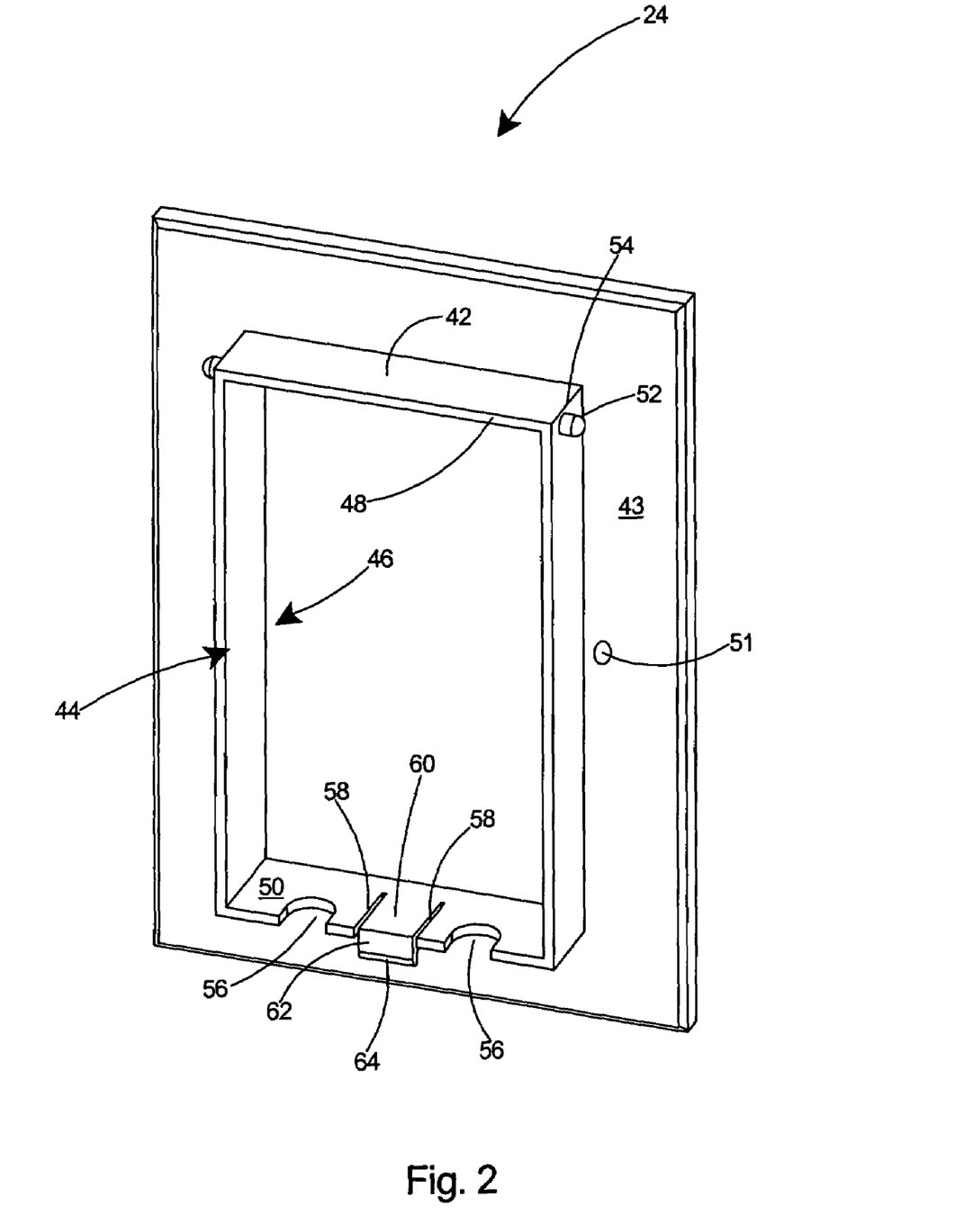
FIG. 2 is a perspective view of a preferred embodiment of an outer box portion of an electrical box according to the present invention.
Figure 11:
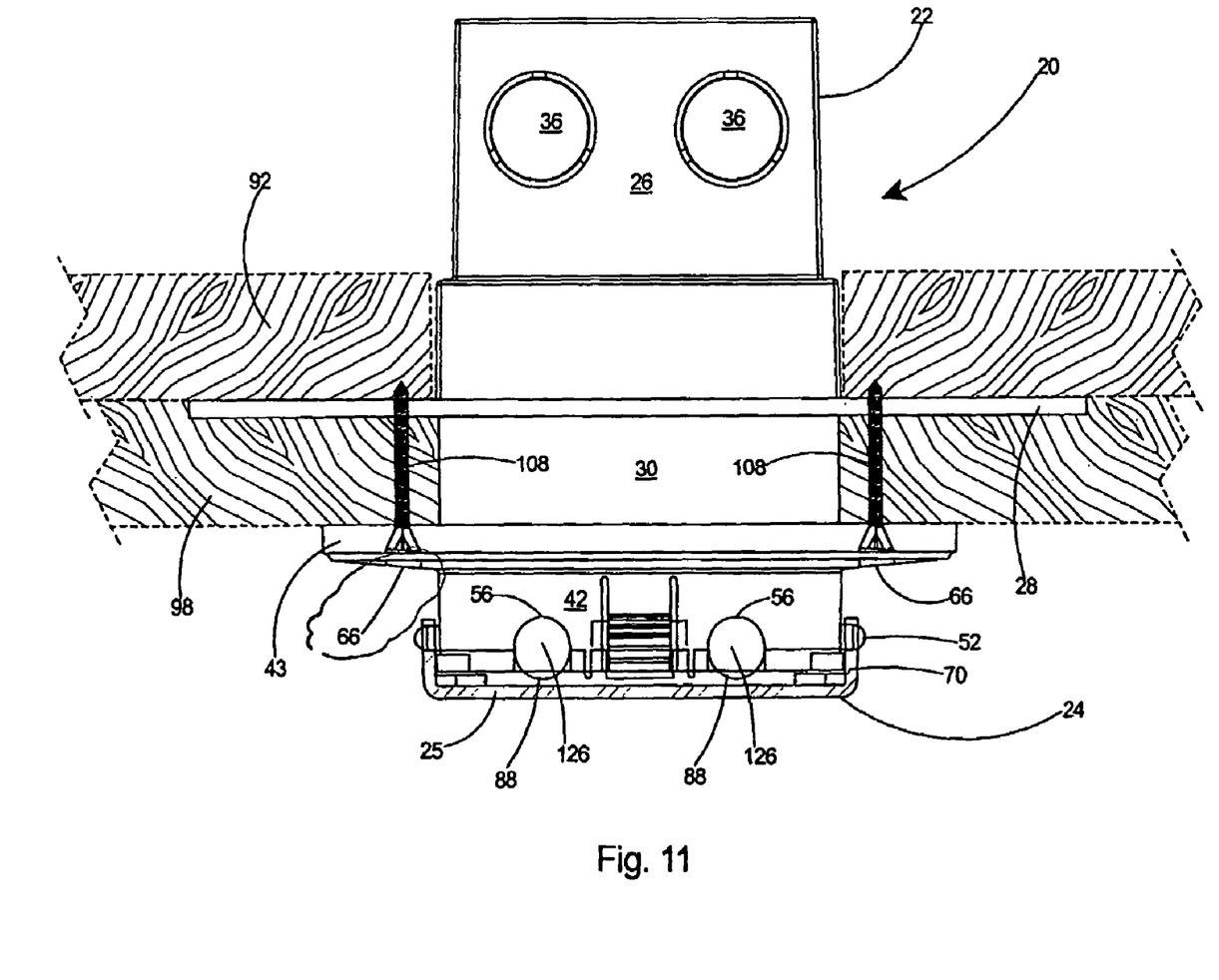
FIG. 11 is a bottom view of the electrical box installed on a wall and with the cover in a closed position.

Referring to FIG. 2, the outer box 24 includes a front peripheral wall 42, an outer flange 43, a front opening 44, a rear opening 46, a front edge 48, a bottom portion 50 on the front peripheral wall 42, and an aperture 51 in the outer flange 43 adjacent the front peripheral wall 42. Posts 52 extend from the upper end 54 of the front peripheral wall 42 and U-shaped slots 56 extend into the bottom portion 50 of the front peripheral wall 42 from the front edge 48. Openings 58 in the bottom portion 50 define a latch member 60 that includes a downward depending portion 62 and a bottom lip 64. As an alternative to the apertures 51 in the outer flange 43, as shown in FIG. 11 the outer flange 43 can be provided with indentations 66 therein to form guides for drilling of holes.

Figures 10, 10A, 10B, 10C:
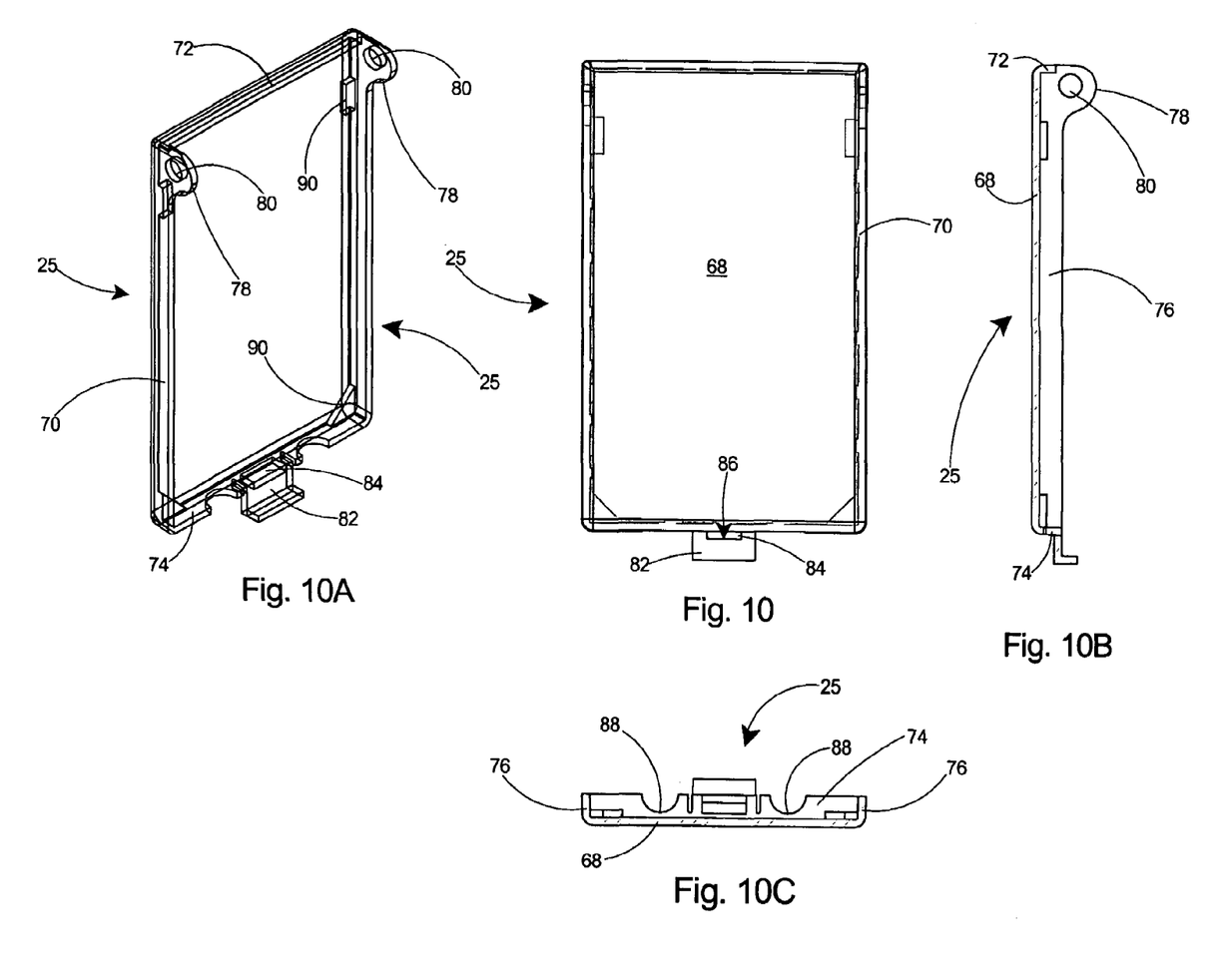
FIG. 10 is a front elevation view of a cover member portion of the electrical box of the present invention.
FIG. 10A is a perspective view of the cover member of FIG. 10.
FIG. 10B is a side view of the cover member of FIG. 10.
FIG. 10C is a bottom view of the cover member of FIG. 10.

With reference to FIGS. 10–10C there is shown the cover member 25 used with the two-piece electrical box. The cover 25 includes a front wall 68, and a stiffening peripheral wall 70 orthogonal to the front wall 68. The stiffening peripheral wall 70 includes an upper wall 72, lower wall 74, and side walls 76. The stiffening peripheral wall 70 rigidifies and provides structural support to the front wall 68 of the cover member 25. The cover member 25, which much pass an impact test according to the electrical code, is typically constructed of high impact resistant plastic. The high impact-resistant plastic is more expensive than typical non impact-resistant plastics that are used to construct the inner and outer boxes of the present invention. The cover member 25 of the present invention is therefore made as small in size as possible to lower production costs. To lower the weight of high impact-resistant plastic used, the stiffening peripheral wall 70 extends no more than 0.30 inch from the front wall 68 and the front wall 68 is no greater than 3.5 inches width by 6.0 inches length. Therefore the largest volume component of the present invention consists of the inner box 22, which is constructed of cheaper non-impact resistant plastics. The inner box 22 is typically molded of non-impact resistant plastic in one piece. The cover member 25 is typically molded of high impact resistant plastic in one piece.

Ears 78 extend from the top end of the side walls 76 and include apertures 80 therein. A tab 82 extends downward from the lower wall 74 of the cover member 25. The cover member 25 includes an opening 84 in the lower wall 74 of the cover member 25 that extends therefrom into the tab 82. The tab 82 includes an upper edge 86 at the opening 84. As shown in FIG. 10C, the cover member 25 includes one or more U-shaped slots 88 in the lower wall 74. Integral spacers 90 are included on the inner surface of the cover member 25.

Figure 4:
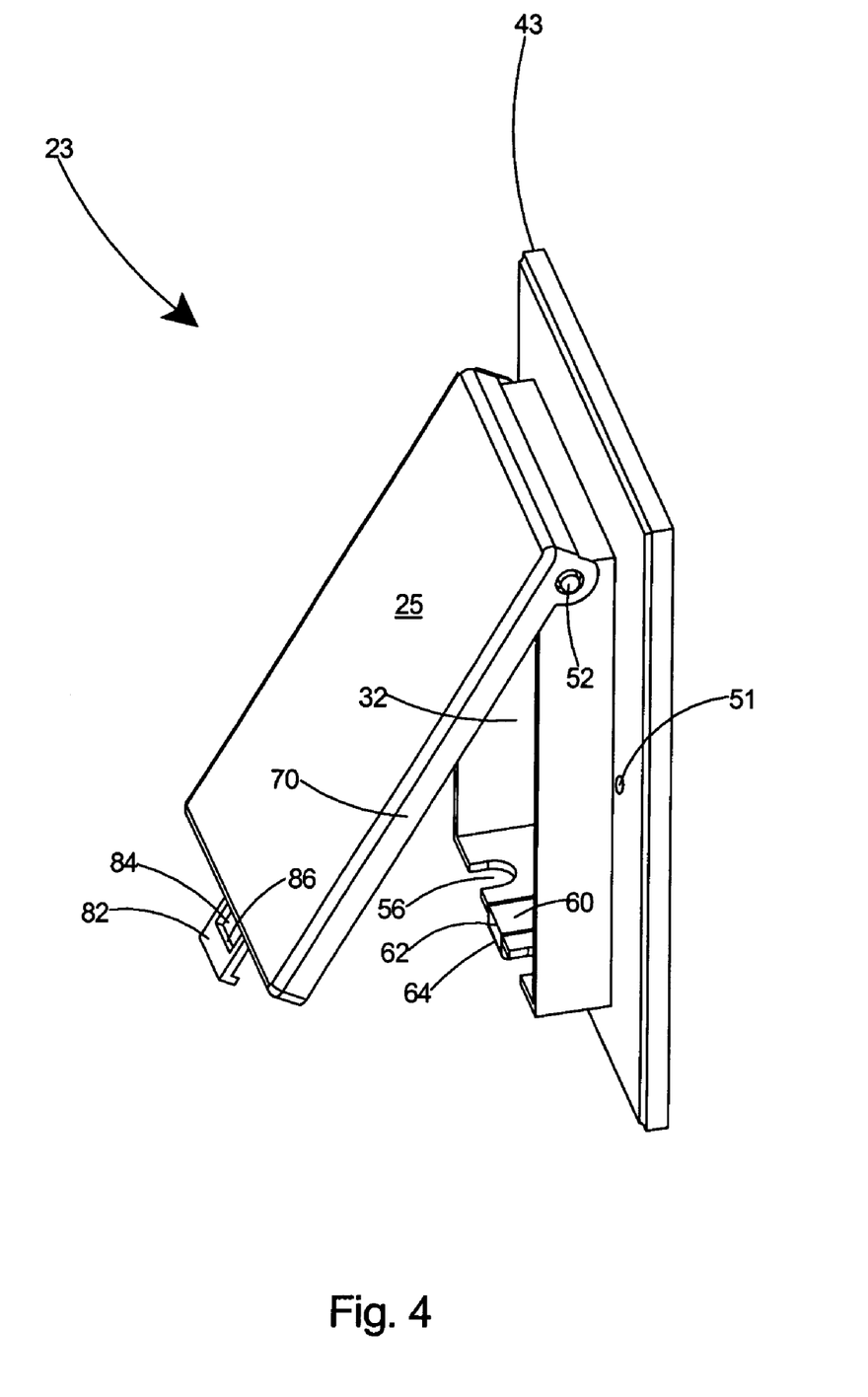
FIG. 4 is a perspective view of the outer box portion of FIG. 2.
Figure 6:
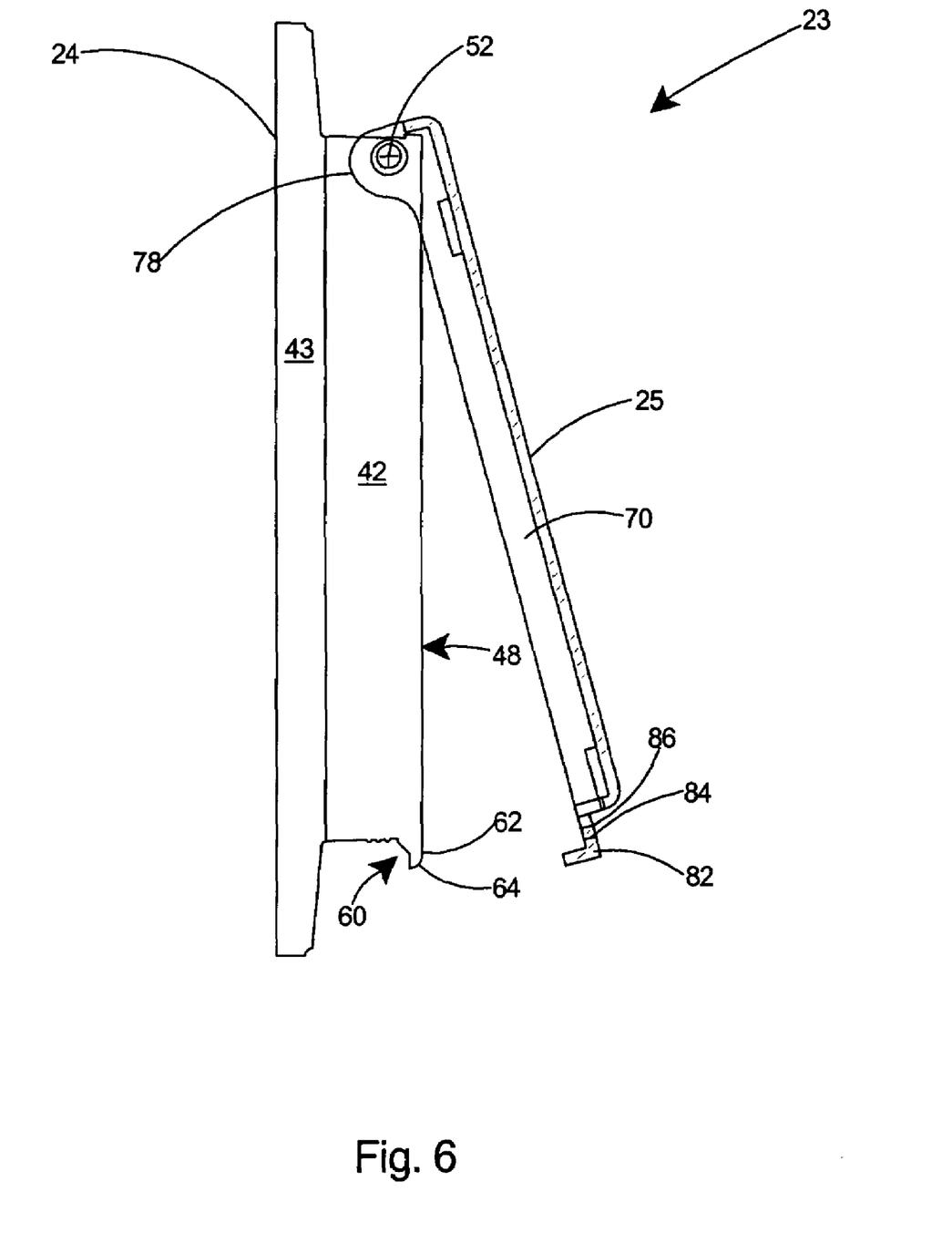
FIG. 6 is a side view of the outer box portion of FIG. 2.

With reference to the second piece 23 of the electrical box shown in FIGS. 4 and 6, when the cover member 25 is pivotally closed on the outer box 24, the upper edge 86 on the opening 84 in the tab 82 engages the downward depending portion 62 on the latch member 60 of the outer box 24. The outer flange 43 extends outward transversely substantially beyond the front peripheral wall 42 of the outer box 24.

Referring to FIG. 7, an exploded side view depicts the sequence of steps in operating the present invention. The two-piece electrical box is typically installed on a newly constructed building in which the substrate 92 has been installed but the outer wall covering has not been attached. A hole 94 is created at the desired location for the electrical box. The inner box 22 is then pushed into the hole 94 until the inner flange 28 contacts the substrate 92. Fasteners 96 are tightened through the openings 40 in the ears 38 of the inner flange 28 and into the substrate 92 to secure the inner box 22 to the substrate 92. The outer wall covering is then installed over the inner flange 28, such as the lapped siding 98 shown in FIG. 7 or any other covering such as stucco (not shown). An electrical device, such as the duplex outlet 100 shown in FIG. 7, is then secured in the inner box 22 with device fasteners 102. A face plate 104 is then typically secured to the duplex outlet 100. The second piece 23 of the electrical box, including the outer box 24 and the cover 25, are then secured to the inner box 22 and substrate 92 by a fastening arrangement 106 that includes fasteners 108 secured through the aperture 51 in the outer flange 43 and aperture 41 in the inner flange 28. Alternatively, after aligning the second piece 23 with the first piece or inner box 22, holes could be drilled in the lapped siding 98, the inner flange 28, and substrate 92, and fasteners 108 tightened therein to secure the second piece 23 to the inner box 22 and to the wall.

Figure 8:
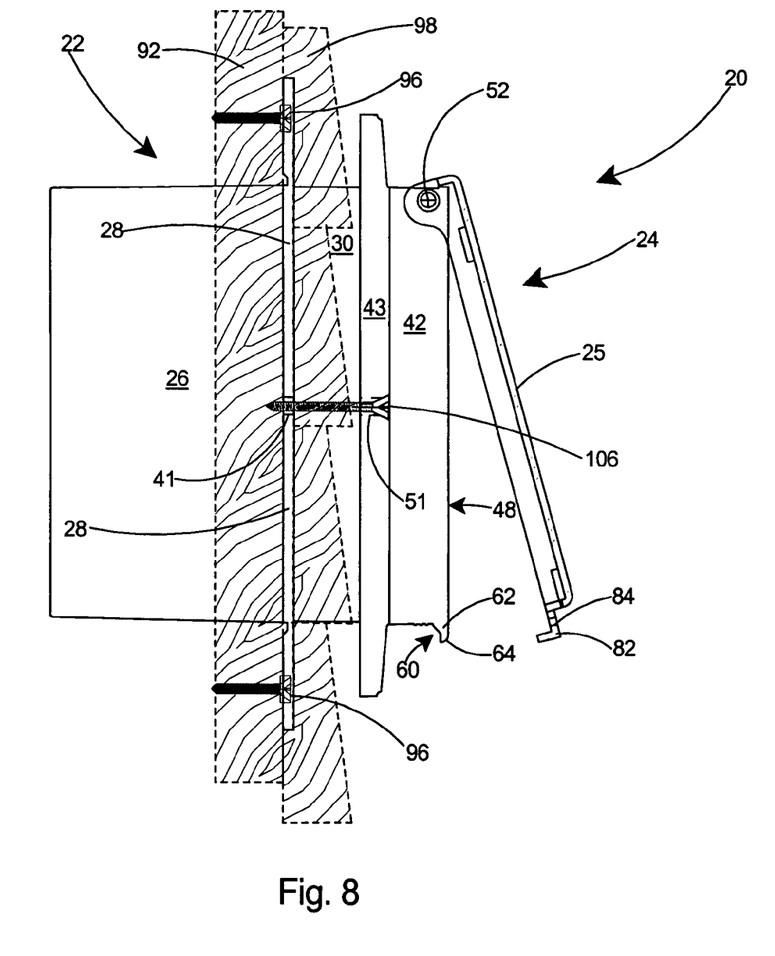
FIG. 8 is a side view of the two-piece electrical box secured to a wall.

Referring to FIG. 8, a side view of the two-piece electrical box 20 after it is secured to a wall, the fastening arrangement 106 for securing the outer box 24 to the inner box 22 and the wall includes one or more apertures 51 in the outer flange 43 and one or more apertures 41 in the inner flange 28. Each of the apertures 41 in the inner flange 28 is in axial alignment with a corresponding aperture 51 in the outer flange 43. The fastening arrangement 106 includes one or more fasteners 108 threaded through each of the apertures 51 in the outer flange 43 and secured into the corresponding apertures 41 in the inner flange 28. The cover 25 is pivotable about the posts 52 to close or open the electrical box 20 as desired. When closed on the front edge 48 of the outer box 24, the integral spacers 90 provide a gap between the cover 25 and the front edge 48, thereby allowing any rainfall that may enter the electrical box 20 to quickly run out. When the outer box 24 is secured to the inner box 22 and to the substrate 92 as shown in FIG. 8, the inner flange 28 and outer flange 43 reside in parallel planes.

Figure 9:
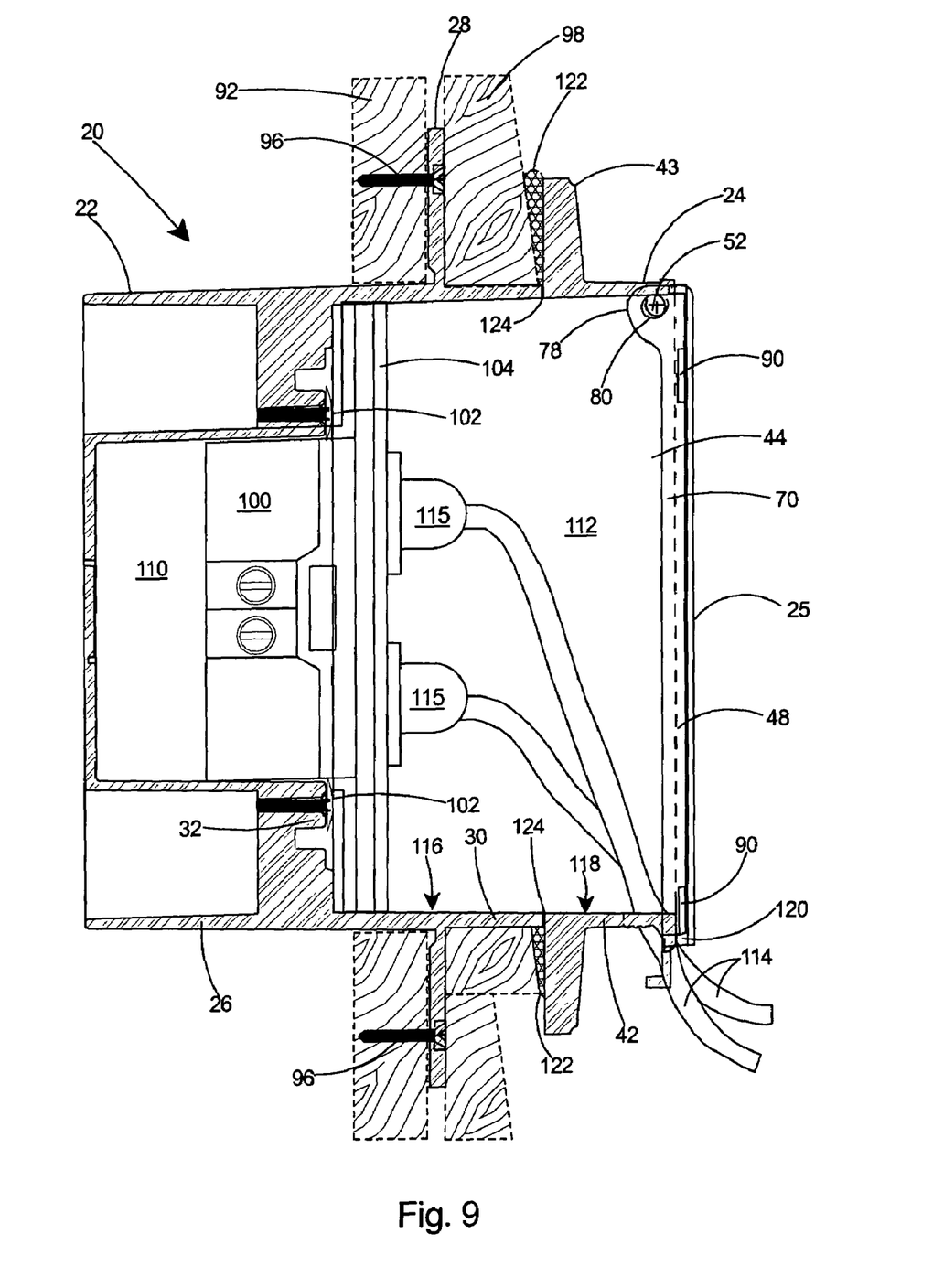
FIG. 9 is a sectional view of the two-piece electrical box with a duplex receptacle installed therein and with electrical cords plugged therein and protected by a closed cover.

FIG. 9 depicts a sectional view of the installed box depicted in FIG. 8. The sidewalls 26 of the inner box 22 define a first enclosure 110 for positioning the duplex outlet 100 well within the wall, thereby shielding the electrical device from impacts. The sidewalls 26 of the inner box 22, the front peripheral wall 42 of the outer box 24, and the cover 25 define a second enclosure 112 for shielding the duplex outlet 100 and any electrical cords 114 plugged therein from rain and other environmental elements. With the cover 25 closed upon the front edge 48 of the outer box 24, the plug ends 115 are protected against rainwater. The front peripheral wall 42 of the outer box 24 substantially matches the size and shape of the forward extending peripheral wall 30 of the inner box 22. The inner surface 116 of the side walls 26 of the inner box 22 and the inner surface 118 of the front peripheral wall 42 of the outer box 24 are gradually sloped downward toward the front edge 48 of the outer box 24. The gradually sloped inner surfaces 116, 118 further enable any rainwater that enters the second enclosure 112 to quickly run out of the electrical box 20. As mentioned previously, the spacers 90 on the cover member 25 further assist in the removal of rainwater by providing a gap 120 between the cover 25 and the front edge 48 of the outer box 24. Caulking 122 may be applied at the interface 124 between the inner box 22 and outer box 24.

Referring to FIG. 11, with the cover 25 closed on the electrical box 20, the U-shaped slots 56 in the front peripheral wall 42 of the outer box 24 and the U-shaped slots 88 in the cover 25 form circular cord openings 126 therein in the bottom of the electrical box 20 when the pivotally connected cover 25 is closed on the outer box 24.

The inner box 22, outer box 24, and cover 25 of the present invention may be formed of metal or plastic, but a particularly preferred construction is by plastic molding. The inner box 22, outer box 24, and cover 25 are preferably molded in one piece from plastic. The plastic is preferably polyvinyl chloride, polyethylene, polycarbonate, or polypropylene.

Having thus described the invention with reference to a preferred embodiment, it is to be understood that the invention is not so limited by the description herein but is defined as follows by the appended claims.

What is claimed is:

1. An electrical box for recessing an electrical device within a wall comprising:
   an inner box including side walls and a planar front edge;
   an inner flange extending outward transversely from said side walls of said inner box;
   a forward extending peripheral wall on said inner box;
   said inner box capable of recessing into a hole in a wall until said inner flange is flush with said wall;
   an outer box including a front opening and an outer flange;
   a fastening arrangement for securing said outer box to said inner box in such a manner that said outer flange of said outer box abuts said planar front edge of said inner box in a common plane with no portion of said outer box extending within said inner box.

2. The electrical box of claim 1 wherein said fastening arrangement includes
   a front peripheral wall on said outer box;
   an outer flange extending outwards transversely from said front peripheral wall of said outer box;
   one or more outer apertures in said outer flange;
   one or more receiving apertures in said inner flange, each of said receiving apertures in axial alignment with one of said outer apertures in said outer flange; and
   a fastener threaded through each of said outer apertures in said outer flange and secured into said receiving apertures in said flange.

3. The electrical box of claim 2 including
   a cover on said front opening of said outer box; and
   said cover pivotally connected to said outer box.

4. The electrical box of claim 3 wherein said inner box, said outer box, and said cover are each integrally formed in one piece.

5. The electrical box of claim 4 wherein said inner box, said outer box, and said cover are formed by injection molding of plastic.

6. The electrical box of claim 5 wherein said plastic is selected from the group including polycarbonate, polyvinyl chloride, polyethylene, or polypropylene.

7. The electrical box of claim 3 wherein
said front peripheral wall of said outer box includes one or more U-shaped slots; and
said cover includes one or more U-shaped slots;
whereby said U-shaped slots in said front peripheral wall of said outer box and said U-shaped slots in said cover form circular cord openings when said pivotally connected cover is closed on said outer box.

8. The electrical box of claim 2 wherein said outer box when secured to said inner box orients said inner and outer flanges in parallel planes.

9. The electrical box of claim 2 wherein
said side walls of said inner box include an inner surface;
said front peripheral wall of said outer box includes an inner surface;
said inner surface of said side walls of said inner box and said inner surface of said front peripheral wall of said outer box are gradually sloped toward said front opening of said outer box.

10. The electrical box of claim 2 wherein
said outer flange extends transversely substantially beyond said front peripheral wall of said outer box; and
said outer flange includes a plurality of indentations therein, whereby said indentations form guides for drilling of holes therein.

11. The electrical box of claim 2 wherein
said outer flange extends transversely substantially beyond said front peripheral wall of said outer box; and
said outer flange includes a plurality of apertures therein, whereby said apertures in said outer flange accept fasteners for securing said outer box to said inner box.

12. The electrical box of claim 1 wherein said inner flange includes openings for receipt of fasteners for securing said inner box to said wall.

13. The electrical box of claim 1 wherein
said inner box includes a back wall; and
said back wall and said side walls of said inner box include one or more removable wall portions which may be removed for passage of wiring therein.

14. The electrical box of claim 1 wherein
said inner box includes a securement arrangement for securing an electrical device therein;
said securement arrangement includes integral projections from said sidewalls into said inner box; and
threaded bores in said integral projections.

15. The electrical box of claim 1 wherein
said inner flange extends transversely substantially beyond said forward extending peripheral wall of said inner box;
ears extending from said inner flange; and
each of said ears including openings therein, said openings capable of accepting fastening devices therethrough.

16. A method of installing an electrical box on a building having a substrate thereon, including:
a) providing an inner box including side walls, an inner flange extending outward transversely from said side walls of said inner box, a forward extending peripheral wall extending from said side walls of said inner box, a planar front edge and openings in said inner flange;
b) providing an outer box having a front peripheral wall, an outer flange extending outward transversely from said front peripheral wall, apertures in said outer flange, a front opening, and a cover pivotally attached at said front opening of said outer box;
c) providing a fastening arrangement for securing said outer box to said inner box;
d) cutting a hole in said substrate;
e) inserting said box into said hole until said back surface of said inner flange is flush against said substrate;
f) inserting fasteners through said openings in said inner flange;
g) tightening said fasteners into said substrate to secure said inner box to said substrate;
h) installing siding on said substrate of said building;
i) aligning said outer box with said inner box such that said side walls of said inner box are aligned with said front peripheral wall of said outer box; and
j) securing said outer box to said inner box and said substrate with said fastening arrangement in such a manner that said outer flange of said outer box abuts said planar front edge of said inner box in a common plane with no portion of said outer box extending within said inner box.

* * * * *